US012584781B2

(12) United States Patent
Sanni

(10) Patent No.: US 12,584,781 B2
(45) Date of Patent: Mar. 24, 2026

(54) CONTAINMENT VESSEL AND WEIGHT GAUGE COMBINATION ASSEMBLY

(71) Applicant: Adedoyin Sanni, Zion, IL (US)

(72) Inventor: Adedoyin Sanni, Zion, IL (US)

( * ) Notice: Subject to any disclaimer, the term of this patent is extended or adjusted under 35 U.S.C. 154(b) by 321 days.

(21) Appl. No.: 18/198,835

(22) Filed: May 17, 2023

(65) Prior Publication Data

US 2024/0385029 A1 Nov. 21, 2024

(51) Int. Cl.
*G01G 19/52* (2006.01)
*G01G 23/16* (2006.01)
*G01G 23/36* (2006.01)

(52) U.S. Cl.
CPC ............. *G01G 19/52* (2013.01); *G01G 23/16* (2013.01); *G01G 23/36* (2013.01)

(58) Field of Classification Search
CPC ......... G01G 19/52; G01G 23/16; G01G 23/36
See application file for complete search history.

(56) References Cited

U.S. PATENT DOCUMENTS

| | | | |
|---|---|---|---|
| 4,696,360 A | 9/1987 | Homen | |
| 9,347,821 B1 | 5/2016 | Mullaney | |
| 9,572,748 B2 | 2/2017 | Lim | |
| D803,005 S | 11/2017 | Lane | |
| 9,981,790 B1 * | 5/2018 | Ost ....................... | B65D 51/248 |
| 10,091,468 B2 * | 10/2018 | Mehrotra ............... | G16H 20/10 |
| 10,281,317 B2 * | 5/2019 | Dubey .................... | G01F 9/003 |
| 10,390,651 B2 | 8/2019 | Beber | |
| 10,455,984 B1 | 10/2019 | Abehasera | |
| 10,506,798 B2 | 12/2019 | Gibbs | |
| 2010/0089152 A1 * | 4/2010 | Kolada .................. | G01G 21/28 |
| | | | 73/426 |
| 2015/0272825 A1 * | 10/2015 | Lim ....................... | G16H 40/67 |
| | | | 340/5.2 |
| 2017/0138782 A1 * | 5/2017 | Beber .................... | G01G 19/52 |
| 2019/0128723 A1 * | 5/2019 | Ishida .................... | G01G 17/04 |
| 2021/0082218 A1 * | 3/2021 | Straughter ......... | G07C 9/00896 |
| 2022/0218137 A1 * | 7/2022 | Iverson ................ | G01G 23/365 |
| 2023/0144707 A1 * | 5/2023 | Lee ......................... | C02F 1/325 |
| | | | 215/11.6 |

FOREIGN PATENT DOCUMENTS

WO WO2020176130 9/2020

* cited by examiner

*Primary Examiner* — Natalie Huls

(57) ABSTRACT

A containment vessel and weight gauge combination assembly for weighing food placed in a container includes a container with an upper edge forming an opening into the container. A scale is coupled to the container and positioned at the bottom of the container for weighing food positioned in the container. A display screen for displaying the weight of the food is positioned in the interior of the container near the upper edge.

1 Claim, 6 Drawing Sheets

CONTAINMENT VESSEL AND WEIGHT GAUGE COMBINATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to weighing apparatuses and more particularly pertains to a new weighing apparatus for weighing food placed in a container.

(2) Description of Related Art Including Information Disclosed Under 37 CFR 1.97 and 1.98

The prior art discloses weighing apparatuses which weigh items placed in a container. However, the prior art does not describe a combination of a container and a scale for weighing food placed in the container in which a display screen for displaying the weight of the food is positioned inside the container. Such a device is desirable because a user may have the display screen in view near an opening into which food is poured, making it easier for the user to pour an accurate amount of food into the container.

BRIEF SUMMARY OF THE INVENTION

An embodiment of the disclosure meets the needs presented above by generally comprising a container having a base and a perimeter wall. The perimeter wall is coupled to and extends upwardly from the base and bounds a containment space. An upper edge of the perimeter wall forms an opening to the containment space. A scale for measuring a weight of food positioned within the container is attached to the container and is positioned at a bottom end of the containment space. A control circuit is electrically coupled to the scale. A housing is coupled to the container, and at least a portion of the housing is positioned in the containment space. The housing also has an interior surface positioned in the containment space. A display screen is electrically coupled to the control circuit and is mounted on the housing. The display screen displays an output indicating the weight measured by the scale and is positioned on the interior surface of the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
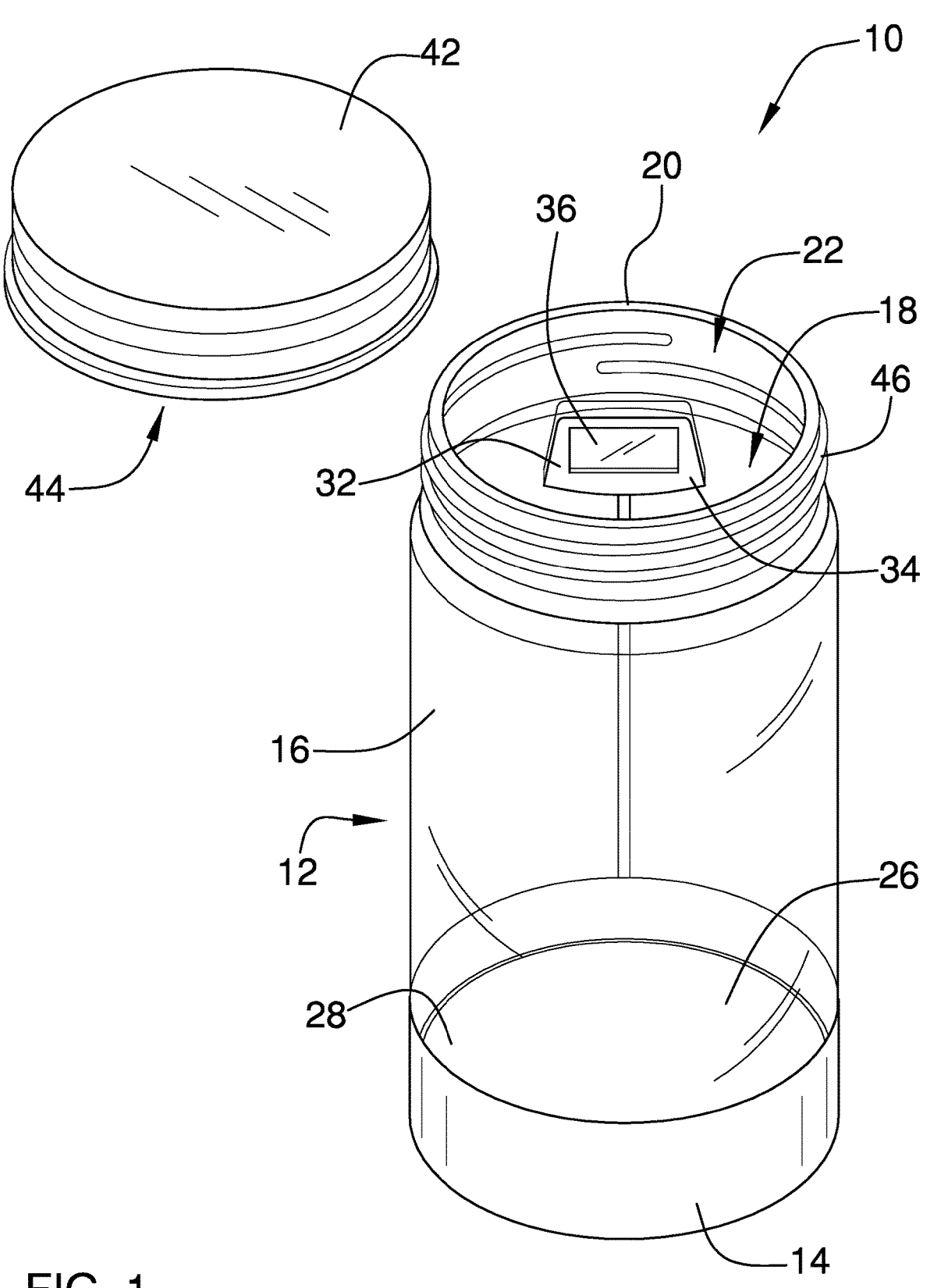
FIG. 1 is a top front perspective view of a containment vessel and weight gauge combination assembly according to an embodiment of the disclosure with a lid removed from a container.
Figure 2:
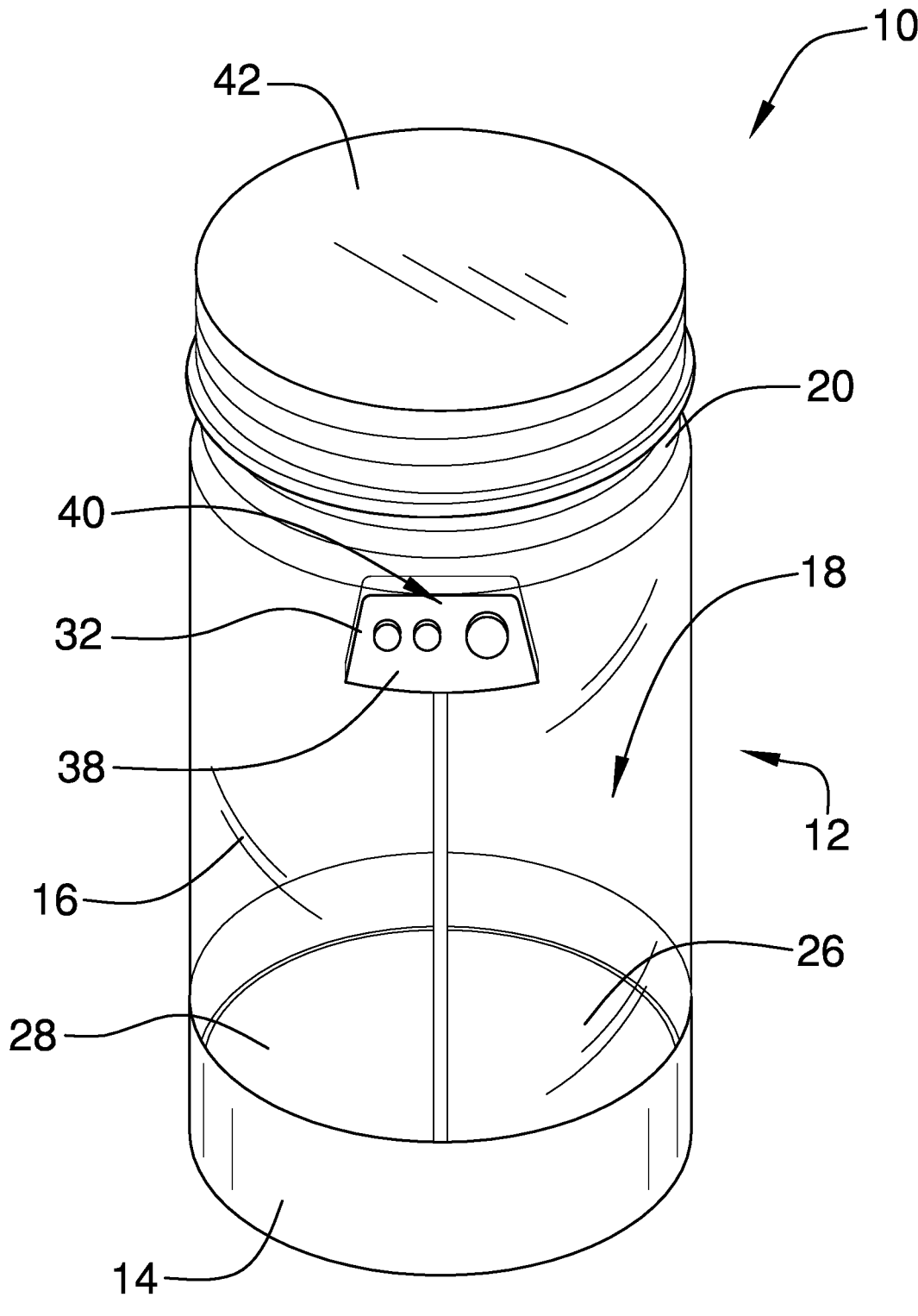
FIG. 2 is a top rear perspective view of an embodiment of the disclosure.
Figure 3:
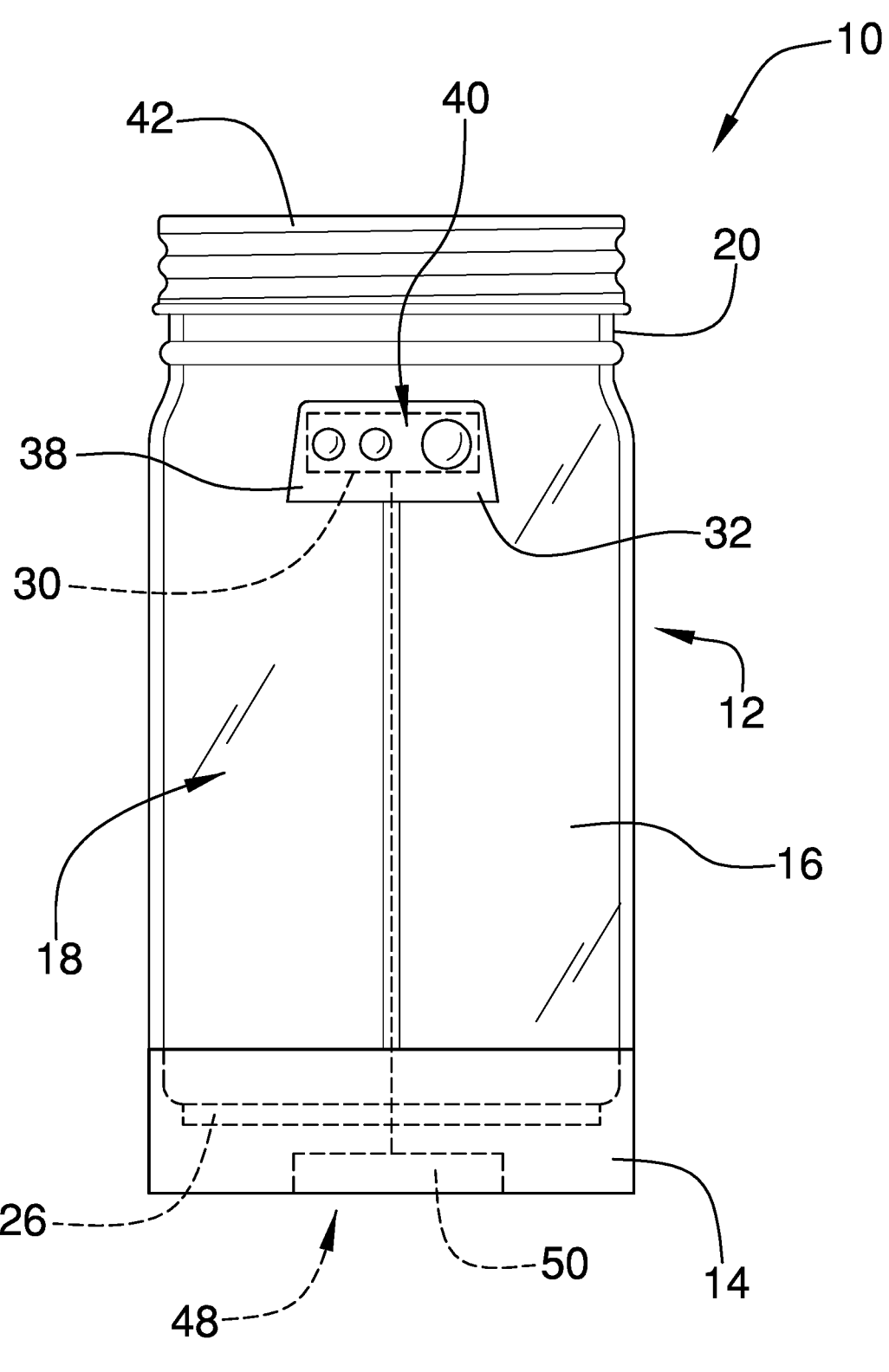
FIG. 3 is a rear view of an embodiment of the disclosure.
Figure 4:
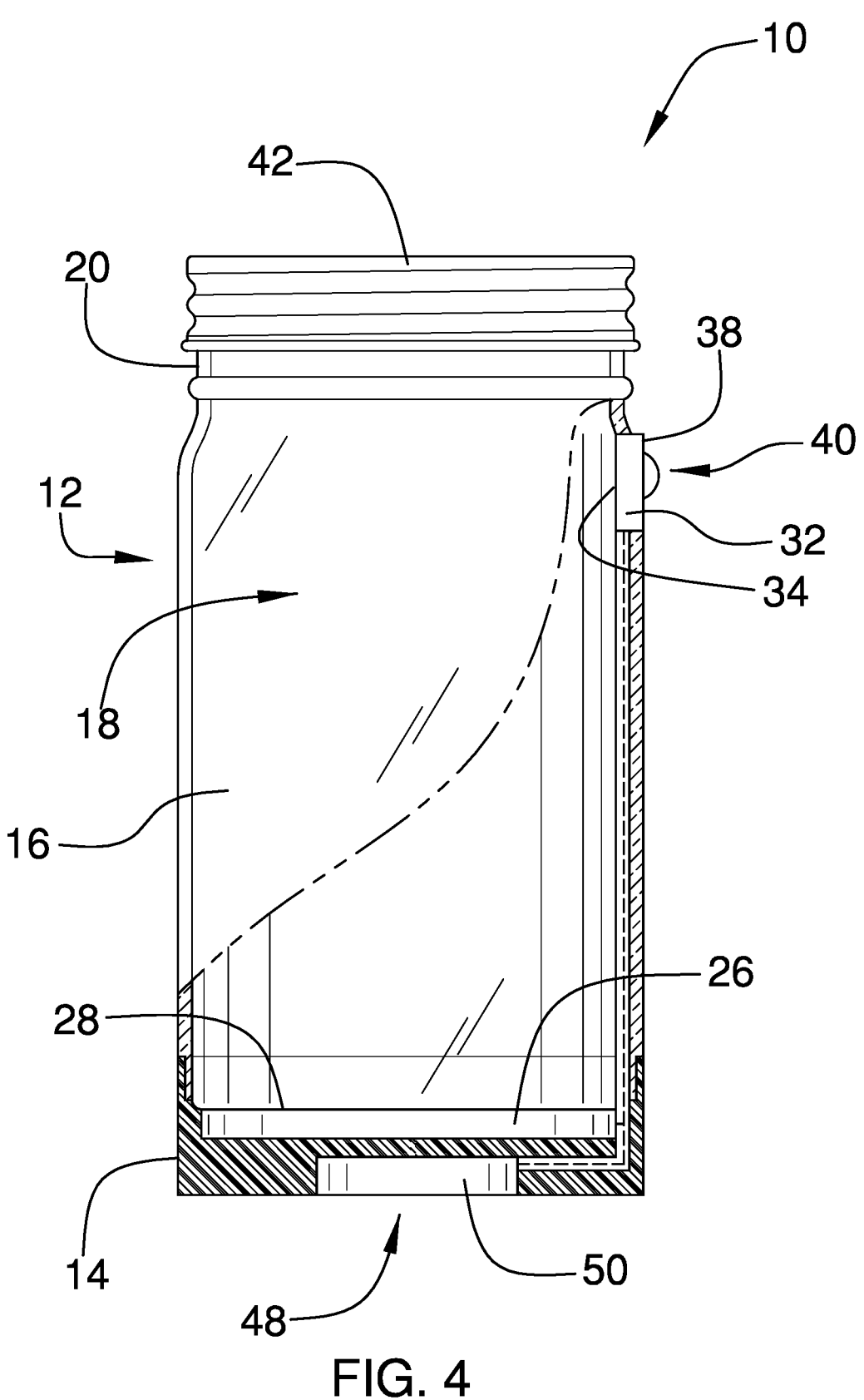
FIG. 4 is a side partial cross section view of an embodiment of the disclosure.
Figure 5:
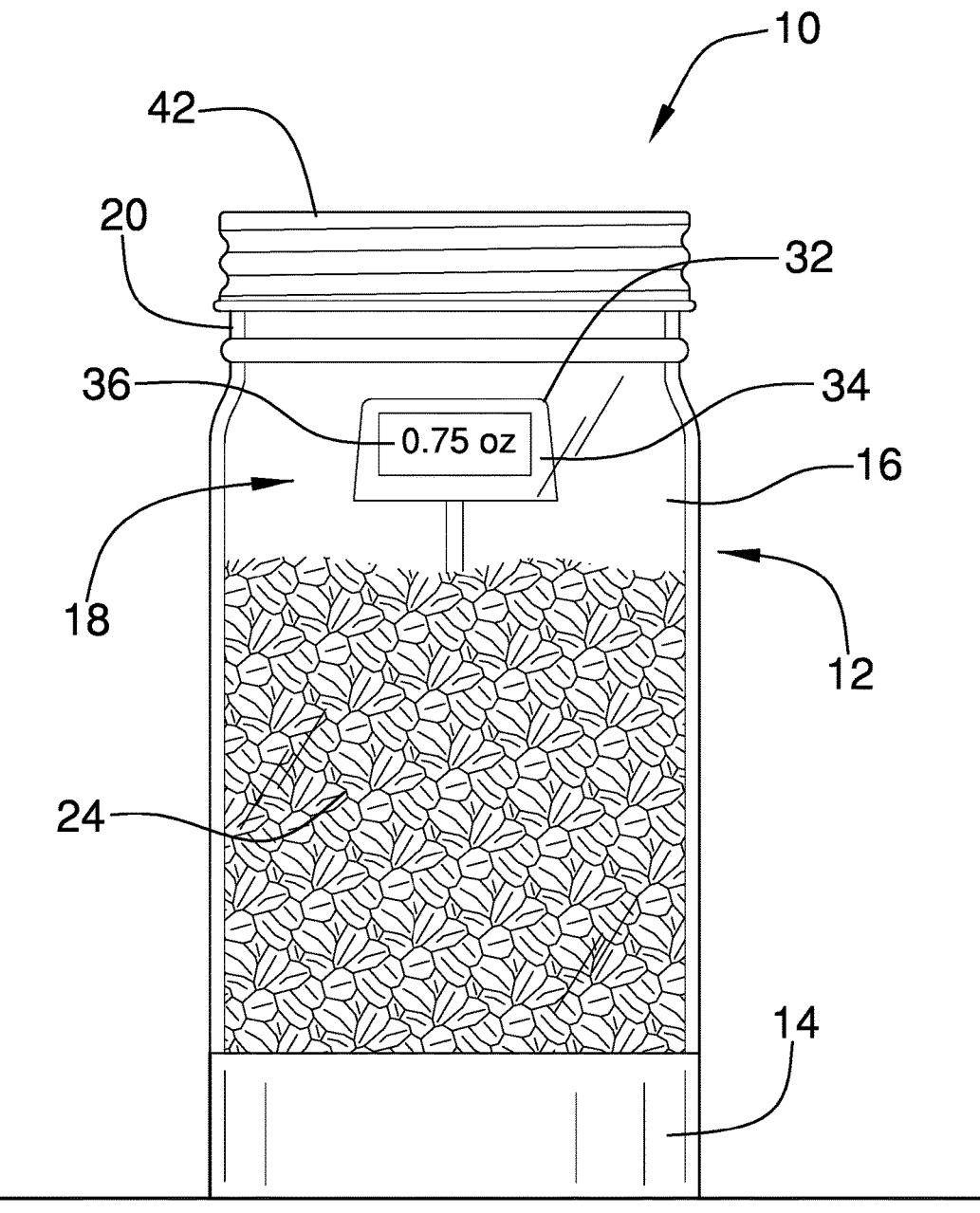
FIG. 5 is an in-use view of an embodiment of the disclosure.
Figure 6:
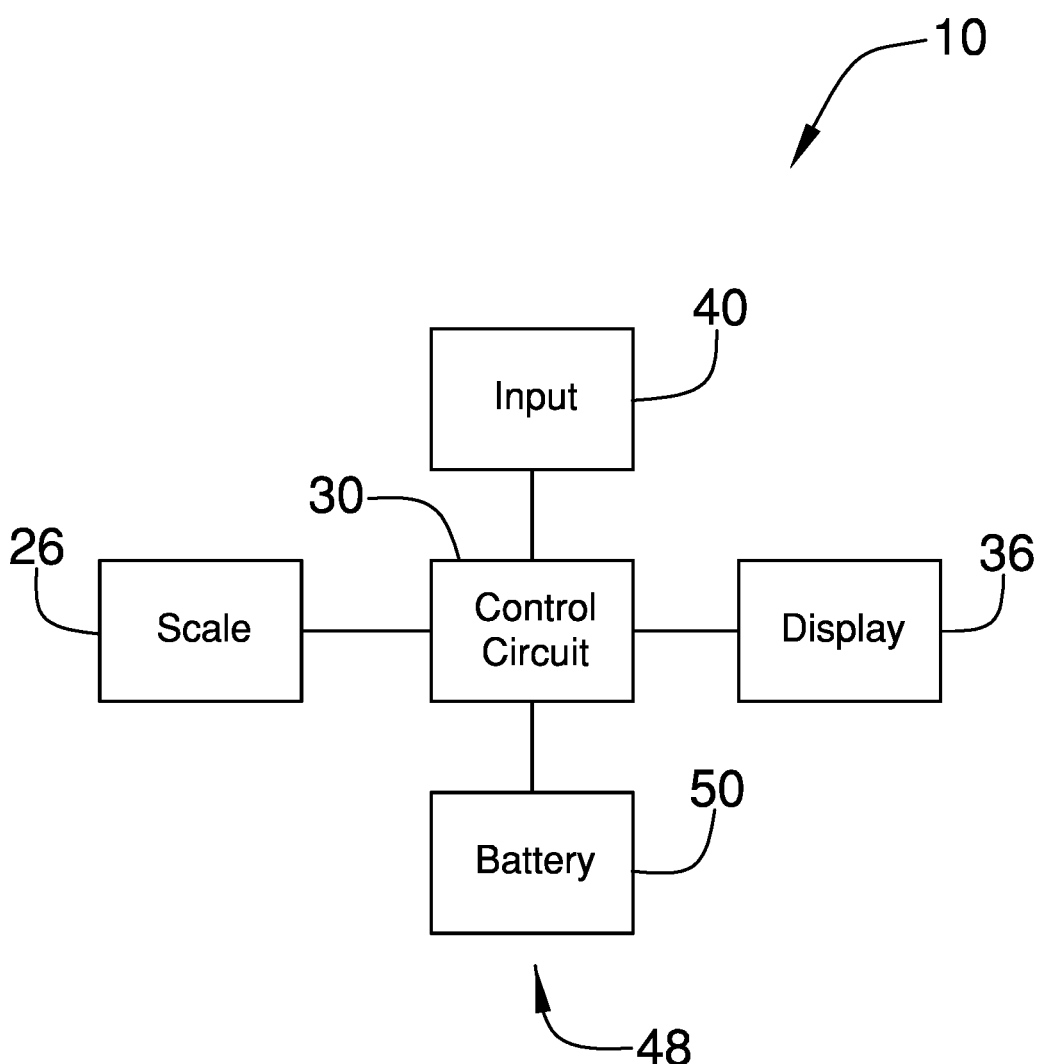
FIG. 6 is a block diagram of an embodiment of the disclosure.

With reference now to the drawings, and in particular to FIGS. 1 through 6 thereof, a new weighing apparatus embodying the principles and concepts of an embodiment of the disclosure and generally designated by the reference numeral 10 will be described.

As best illustrated in FIGS. 1 through 6, the containment vessel and weight gauge combination assembly 10 generally comprises a container 12 having a base 14 and a perimeter wall 16. The perimeter wall 16 is coupled to and extends upwardly from the base 14 and also bounds a containment space 18. An upper edge 20 of the perimeter wall 16 forms an opening 22 to the containment space 18. The perimeter wall 16 is translucent such that food 24 positioned in the containment space 18 is viewable through the perimeter wall 16. A scale 26 for measuring a weight of food 24 positioned within the container 12 is attached to the container 12 and is positioned at a bottom end 28 of the containment space 18.

A control circuit 30 is electrically coupled to the scale 26. A housing 32 is coupled to the container 12, and at least a portion of the housing 32 is positioned in the containment space 18. The housing 32 has an interior surface 34 positioned in the containment space 18 and adjacent to the upper edge 20 of the perimeter wall 16. A display screen 36 is electrically coupled to the control circuit 30 and is mounted on the housing 32. The display screen 36 displays an output indicating the weight measured by the scale 26, the display screen 36 is positioned on the interior surface 34 of the housing 32 and is viewable through the perimeter wall 16.

The housing 32 extends through the perimeter wall 16 and has an exterior surface 38 positioned outside of the containment space 18 where an input 40 is mounted to the housing 32. The input 40 is electrically coupled to the control circuit 30, and the control circuit 30 is programmed to receive instructions from the input 40. The input 40 is actuatable to direct the control circuit 30 to turn the display screen 36 alternately on and off, tare the output, and select one of a plurality of measurement standards to display the weight.

A lid 42 is removably coupled to the upper edge 20 of the perimeter wall 16 to close the opening 22. The lid 42 has interior threads 44 complementary in shape to exterior threads 46 of the perimeter wall 16. A power supply 48 is electrically coupled to the control circuit 30 and is mounted to the container 12. The power supply 48 comprises a battery 50. The control circuit 30 also may be electrically couplable to an external power source.

In use, food 24 is added into the containment space 18 when the lid 42 is uncoupled from the perimeter wall 16. The scale 26 weighs the food 24, and the display screen 36 displays the output indicating the weight measured by the scale 26. An advantage of the position of the display screen 36 in the containment space 18 and near the upper edge 20 of the perimeter wall 16 is that the user may easily view the display screen 36 while pouring food 24 into the container 12. The lid 42 is coupled to the perimeter wall 16 to close the opening 22. The output may be tared to calibrate the scale 26 when no food 24 is in the container 12. The output may also be tared to add multiple ingredients successively to the container 12 and weigh each ingredient individually.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A containment vessel and weight gauge combination assembly comprising:
   a container having a base and a perimeter wall, the perimeter wall being coupled to and extending upwardly from the base, the perimeter wall bounding a containment space, an upper edge of the perimeter wall forming an opening to the containment space, the perimeter wall being translucent such that food positioned in the containment space is viewable through the perimeter wall;
   a scale being attached to the container for measuring a weight of food positioned within the container, the scale being positioned at a bottom end of the containment space;
   a control circuit being electrically coupled to the scale;
   a housing being coupled to the container, at least a portion of the housing being positioned in the containment space, the housing having an interior surface positioned in the containment space, the housing being positioned adjacent to the upper edge of the perimeter wall, the housing extending through the perimeter wall and having an exterior surface positioned outside of the containment space;
   a display screen being electrically coupled to the control circuit and being mounted on the housing, the display screen displaying an output indicating the weight measured by the scale, the display screen being positioned on the interior surface of the housing, wherein the display screen is viewable through the perimeter wall;
   an input being electrically coupled to the control circuit and being mounted on the housing, the input being actuatable to turn the display screen alternately on and off, the input being actuatable to cause the control circuit to tare the output, the input being actuatable to select one of a plurality of measurement standards to display the weight, the input being positioned on the exterior surface of the housing;
   a lid being removably coupled to the upper edge of the perimeter wall to close the opening, the lid having interior threads complementary in shape to exterior threads of the perimeter wall; and
   a power supply being electrically coupled to the control circuit and being mounted to the container, the power supply comprising a battery.

\* \* \* \* \*